(12) United States Patent
Tamura

(10) Patent No.: US 11,487,195 B2
(45) Date of Patent: Nov. 1, 2022

(54) DOME SCREEN, DOME SCREEN PROJECTION APPARATUS, AND METHOD FOR FABRICATING THE SAME

(71) Applicant: WONDER VISION TECHNO LABORATORY CO., LTD., Tokyo (JP)

(72) Inventor: Goro Tamura, Tokyo (JP)

(73) Assignee: WONDER VISION TECHNO LABORATORY CO., LTD.

( * ) Notice: Subject to any disclaimer, the term of this patent is extended or adjusted under 35 U.S.C. 154(b) by 0 days.

(21) Appl. No.: 17/049,049

(22) PCT Filed: Apr. 26, 2018

(86) PCT No.: PCT/JP2018/017067
§ 371 (c)(1),
(2) Date: Oct. 20, 2020

(87) PCT Pub. No.: WO2019/207735
PCT Pub. Date: Oct. 31, 2019

(65) Prior Publication Data
US 2021/0240067 A1 Aug. 5, 2021

(51) Int. Cl.
*G03B 21/60* (2014.01)
*G03B 21/58* (2014.01)
(52) U.S. Cl.
CPC .............. *G03B 21/60* (2013.01); *G03B 21/58* (2013.01)
(58) Field of Classification Search
CPC ........ G03B 21/58; G03B 21/60; G03B 21/10; G03B 21/2066; G03B 21/28
(Continued)

(56) References Cited

U.S. PATENT DOCUMENTS 5,724,775 A * 3/1998 Zobel, Jr. .............. E04B 1/3211
359/443
6,665,985 B1 * 12/2003 Hennes ..................... E04H 3/22
352/69
(Continued)

FOREIGN PATENT DOCUMENTS

JP 58088265 6/1983
JP 6130495 5/1994
(Continued)

OTHER PUBLICATIONS

International Search Report dated Jul. 24, 2018 in International Application No. PCT/JP2018/017067 together with English-language machine translation.
(Continued)

*Primary Examiner* — Christopher E Mahoney
(74) *Attorney, Agent, or Firm* — Adams & Wilks

(57) ABSTRACT

A dome screen projection apparatus has screen members made of synthetic resin and detachably joined together to form a dome screen having a curved configuration. Frame members are detachably connected together to form a frame, and suspension members suspend the dome screen in a suspended condition from the frame. The frame members include frame column members disposed on the outside of the dome screen, one at each side of the dome screen and one at the rear of the dome screen, a frame beam member supported at opposite ends at upper portions of the two frame column members at each side of the dome screen and extending above the top front portion of the dome screen, and a frame arc-shaped beam member supported at upper portions of the frame column members. A projector is supported by the frame and projects an image on an inner face of the dome screen while the dome is in the suspended condition. The dome screen may have a generally hemispherical shape with an open front that enables viewers
(Continued)

located in front of the dome screen to view an image projected on the inner face of the dome screen. The dome screen projection apparatus can be easily assembled and disassembled on site and moved to another site for assembly and disassembly.

17 Claims, 12 Drawing Sheets

(58) Field of Classification Search
  USPC .......................................................... 359/451
  See application file for complete search history.

(56) References Cited

U.S. PATENT DOCUMENTS

| | | | | |
|---|---|---|---|---|
| 7,766,483 | B2* | 8/2010 | Balu | G03B 21/56 |
| | | | | 348/121 |
| 2008/0079915 | A1* | 4/2008 | Amano | H04N 9/3141 |
| | | | | 348/E5.143 |
| 2011/0157694 | A1 | 6/2011 | Ferren et al. | 359/445 |
| 2011/0249330 | A1* | 10/2011 | Anderson | G03B 21/62 |
| | | | | 359/460 |
| 2014/0192332 | A1* | 7/2014 | Koyama | F16M 11/2057 |
| | | | | 353/119 |
| 2014/0230340 | A1* | 8/2014 | Fox | A63G 31/02 |
| | | | | 52/7 |

FOREIGN PATENT DOCUMENTS

| | | |
|---|---|---|
| JP | 7250337 | 9/1995 |
| JP | 11095708 | 4/1999 |
| JP | 2000330208 | 11/2000 |
| JP | 2001183993 | 7/2001 |
| JP | 2002131842 | 5/2002 |
| JP | 2002276179 | 9/2002 |
| JP | 2003035933 | 2/2003 |
| JP | 2005017399 | 1/2005 |
| JP | 2006106487 | 4/2006 |
| JP | 2006220772 | 8/2006 |
| JP | 2009276441 | 11/2009 |
| JP | 2010224207 | 10/2010 |
| JP | 2012027430 | 2/2012 |
| JP | 2013026824 | 2/2013 |
| JP | 2013246235 | 12/2013 |
| JP | 2015132748 | 7/2015 |
| JP | 2018077346 | 5/2018 |

OTHER PUBLICATIONS

[online], Sep. 28, 2017, [retrieved on Jul. 5, 2018], Internet: <URL:https://adv.asahi.com/creator/11170036.html>, entire text, all drawings, particularly, [WV Sphere 5.2] (Edited by the Asahi Shimbun Media Business Division, Creator interview), non-official translation (The video experience pursued by a player, "Please tell me the characteristics of the video system 'WV Sphere 5.2' developed by Mr. Tamura" and drawings, etc.).

WV Sphere 5.2, YouTube [online] [video], Mar. 1, 2018, [retrieved on Jul. 5, 2018], Internet: <URL:https://www.youtube.com/watch?v=kATSduImaxU&feature=youtu.be>, non-official translation (WV Sphere 5.2 assembly 4K lapse).

[WV Sphere 5.2] InterBEE, YouTube [online] [video], Nov. 16, 2016, [retrieved on Jul. 5, 2018], Internet: <URL:https//www.youtube.com/watch?v=jWHOY_kxq98>, non-official translation (Demo of video system "WV Sphere 5.2"on InterBEE).

Inter BEE review 2016, Inter Bee Review 2016 [online], Nov. 2016 [retrieved on Jul. 5, 2018], Internet: <URL: http://www.interbee.com/ja/pdf/InterBee_REVIEW2016_j.pdf>, front page, pp. 1, 55, 59, (Edited by Japan Electronics and Information Technology Industries Association, Japan Electronics and Information Technology Industries Association).

* cited by examiner

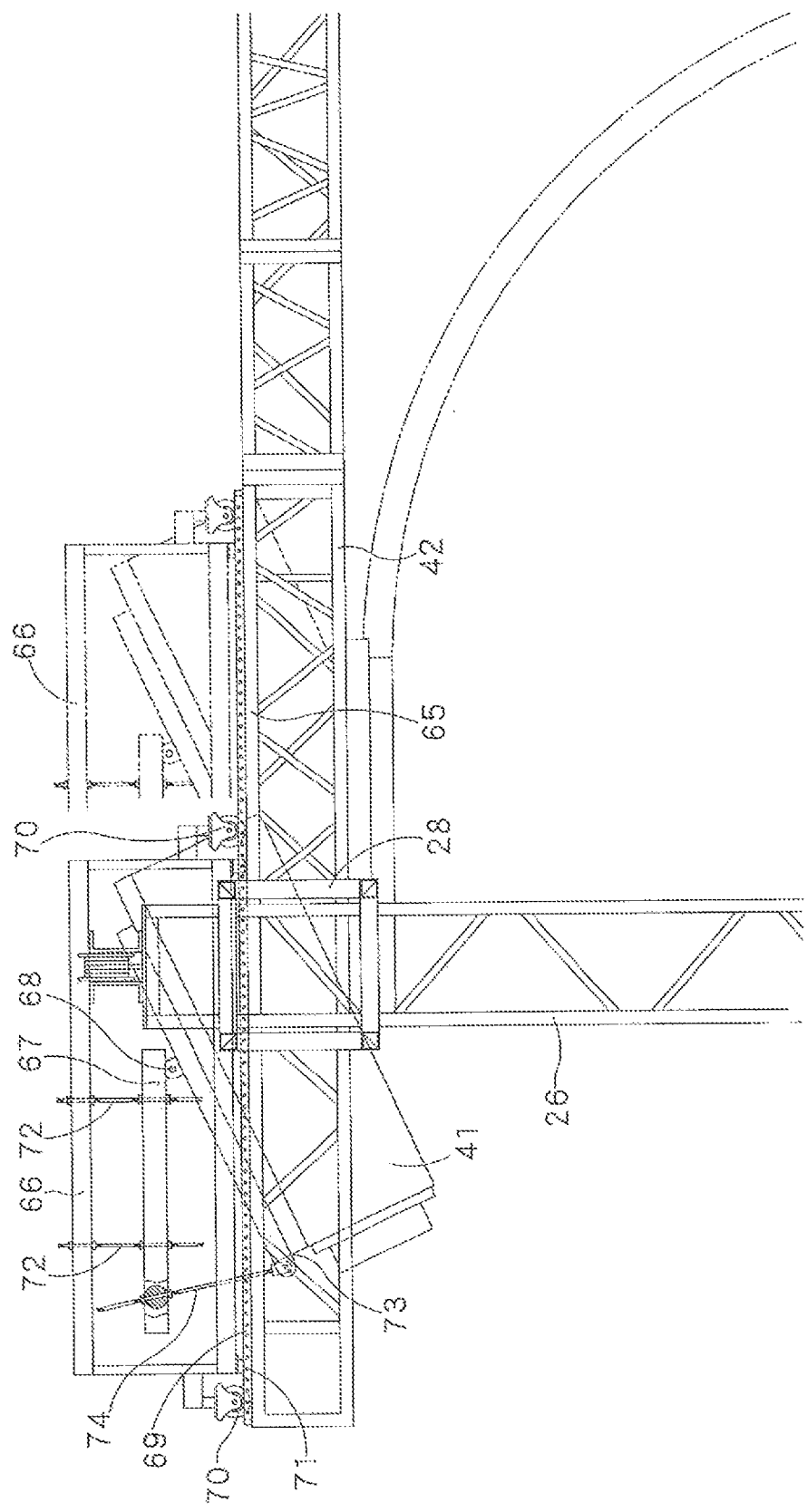

DOME SCREEN, DOME SCREEN PROJECTION APPARATUS, AND METHOD FOR FABRICATING THE SAME

FIELD OF THE INVENTION

The present invention relates to a dome screen used for obtaining stereoscopic images, a screen projection apparatus having a projector for projecting a stereoscopic image on the screen, and a method for fabricating them.

BACKGROUND INFORMATION

As a dome screen used for obtaining stereoscopic images, there has been known the one obtained by forming a hemispherical body with steel members, covering the hemispherical body with a bag-type sheet, and letting the air out of the bag by a pump to form a dome screen on its inner face along the hemispherical body of steel members. (Patent Document 1)

Further, there has also been known a dome integrally combining a screen face and frame parts, obtained by fitting convex sections with concave sections both formed in plural divided pieces made of a light-weight material. (Patent Document 2)

The above-mentioned ones have a large-scale structure. If these are set at one site, they cause no inconvenience, but cause difficulty when it is required to move them.

Reflecting such circumstances, there have also been known movable ones wherein a spherical screen is formed by bonding edge sections of metallic segments and a stereoscopic image is projected inside the screen. (Patent Document 3)

PRIOR ART DOCUMENTS

Patent Documents

Patent Document 1: JP 1999-95708 A
Patent Document 2: JP 2002-276179 A
Patent Document 3: JP 2006-220772 A

SUMMARY OF THE INVENTION

Problems that the Invention is to Solve

The screen of Patent Document 3 is formed to foe capable of being disassembled in respective segments and moved. However, respective segments are made of a metal. Further, since the screen is supported by a stand, the screen becomes heavy as it becomes large, and since such heavy screen cannot be supported by a stand, the size is necessarily limited.

Accordingly, in the present invention, the weight of members constituting the screen is made light, even large screen can easily be formed, and it is designed to be capable of being disassembled easily, moved everywhere, and utilized.

Means of Solving the Problems

It is an object of the present invention to provide a screen having a dome screen formed in a curved shape and a frame holding the screen, wherein the screen is formed by joining plural screen members made of a synthetic resin. The frame is formed by plural components and holds the curved screen in a suspended condition to form the dome screen.

The present invention also provides a dome screen projection apparatus having a projector for projecting a stereoscopic image on the inner face of the dome screen.

Furthermore, fabrication of the dome screen is conducted by installing a basal member on a base site on which the screen is to be set, standing plural joint-type column members on the basal member, attaching a lifting member to the column member, and fixing a beam member to the lifting member; and then, raising the beam member to an intermediate portion of the column member by the lifting member, joining screen members of the screen upper portion and suspending the joined screen members from the beam member; and further, raising the beam member to an upper portion of the column member, joining screen members of the screen lower portion, and integrating the joined screen members of the screen lower portion with the joined screen members of the screen upper portion to complete fabrication of the dome screen.

EFFECTS OF THE INVENTION

In the present invention, since the screen members constituting the screen are made of a synthetic resin as mentioned above, it is possible to forma light weight, screen, desired size screen can easily be produced from a small size to a large size. Since this screen is held by the frame in a suspended condition, the screen made of a synthetic resin is not bent by its own weight and can be held in a normal curved state.

By projecting an image on the dome screen from the projector, the image can be displayed on the screen, and viewers can watch a stereoscopic image.

Further, plural joint-type column members are stood on the basal member installed on the base site, a lifting member is attached to the column member, a beam member is fixed to the lifting member, and in a state where the beam member is raised to an intermediate portion of the column member by the lifting member, screen members of the screen upper portion are joined and the screen upper portion is suspended from the beam member. And further, the beam member is raised to the upper portion of the column member, screen members of the screen lower portion are joined, and the joined screen members of the screen lower portion is integrated with the joined screen members of the screen upper portion. Accordingly, fabrication of the screen members including the screen upper portion and the screen lower portion can be carried out, respectively, on the base site, and therefore it is not necessary to conduct operation at a high site and fabrication can be done safely.

Since the above screen is composed of plural screen members and the frame is also composed of plural members, not only fabrication, but also disassembling is easy, and these can be freely transported and moved and set and utilized everywhere, riot limited to indoor or outdoor use.

BRIEF DESCRIPTION OF THE DRAWINGS

FIG. 20 is an enlarged side view showing another state where the projector is held.

DETAILED DESCRIPTION OF THE PREFERRED EMBODIMENTS

Figure 1:
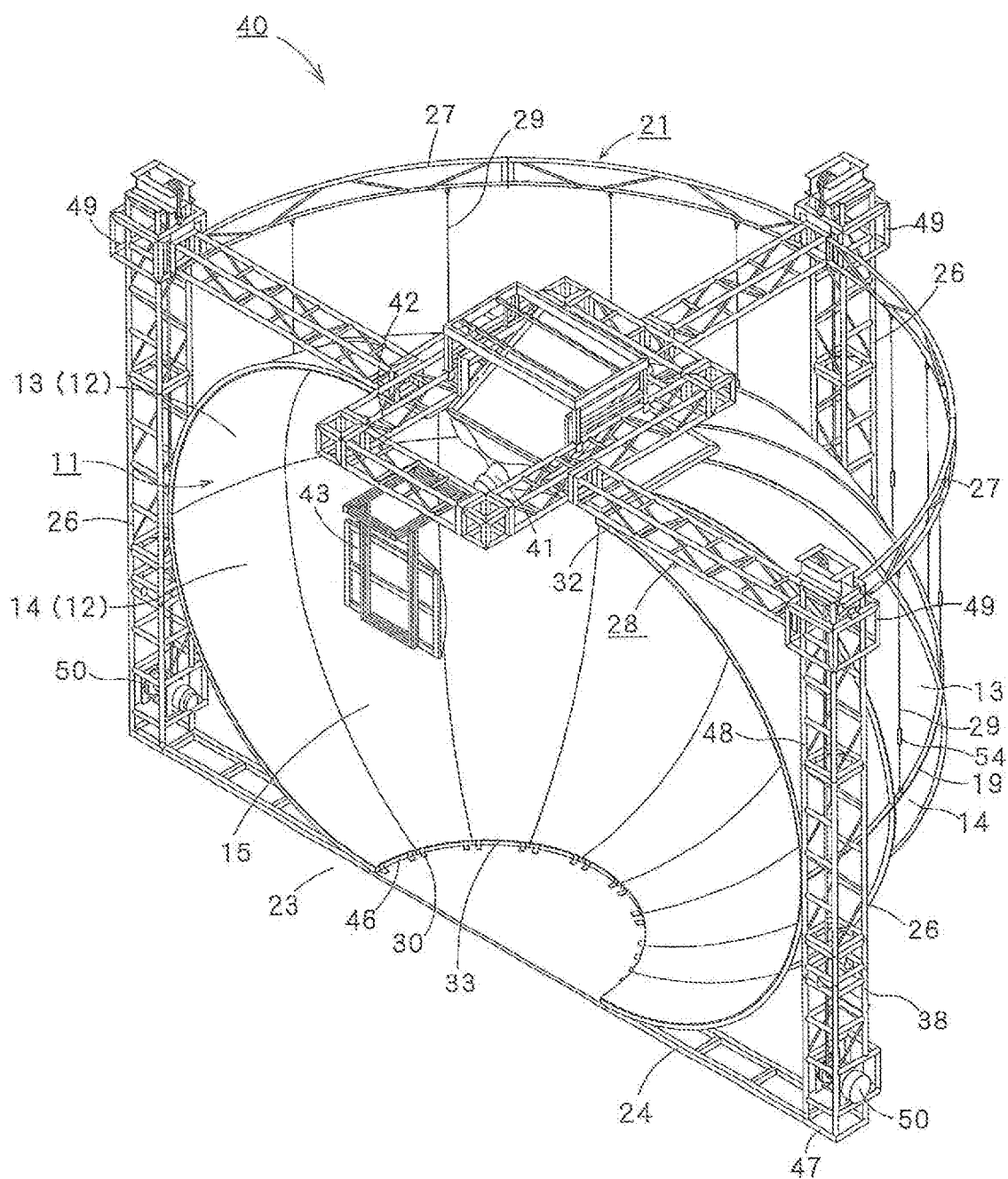
FIG. 1 is a perspective view showing an example of the present invention.

A screen 11 is formed in a curved shape by joining plural screen members 12. In the one shown in FIG. 1, a screen upper portion 13 of the screen 11 is composed of nine pieces of screen members 12, and a screen lower portion 14 is also composed of nine pieces of screen members 12.

Figure 2:
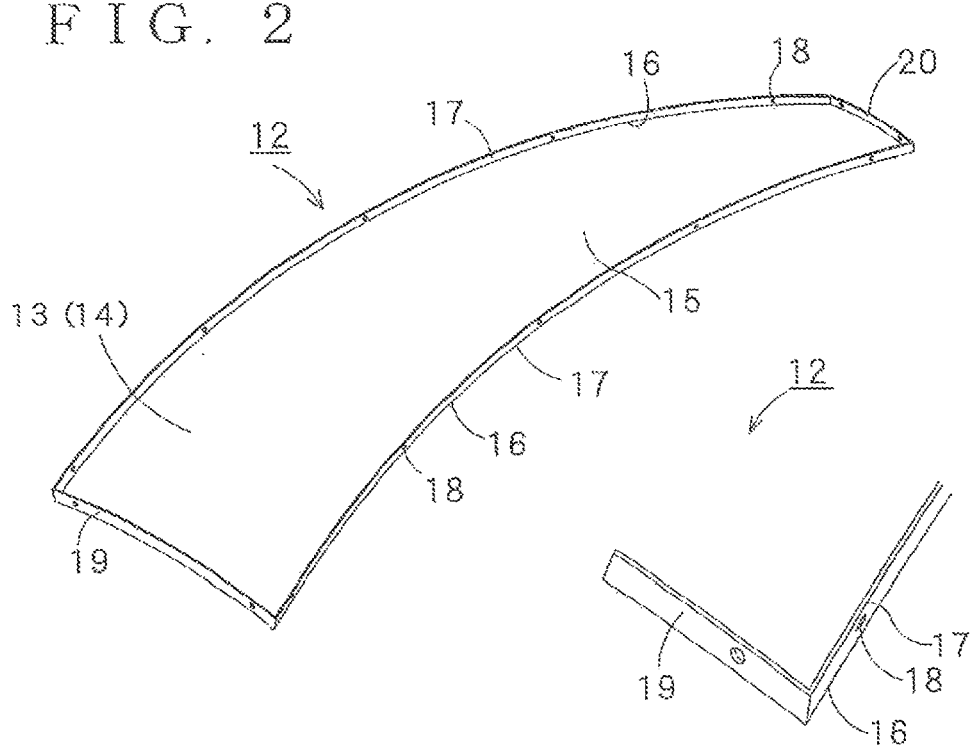
FIG. 2 is a perspective view showing a screen member shown in FIG. 1.
Figure 3:
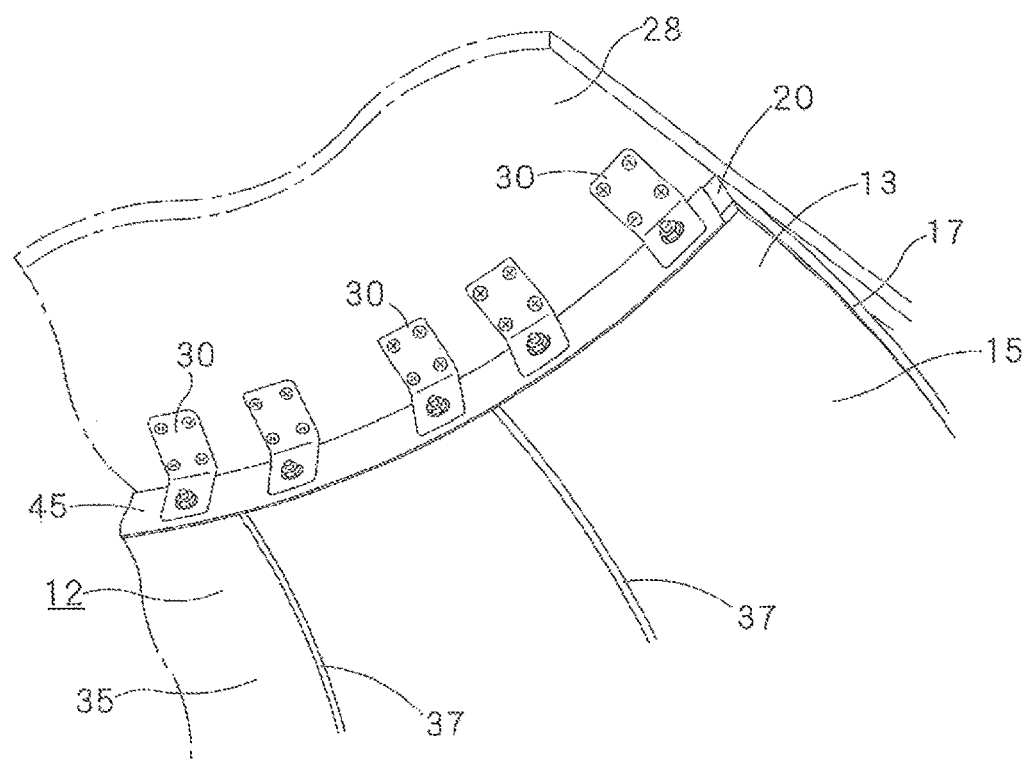
FIG. 3 is a partially omitted perspective view showing a state where the screen member shown in FIG. 2 is set at its upper portion.

Respective screen members 12 are made of a synthetic resin material such as polyethylene, polypropylene, polyamide or the like. The screen member 12 has a curved screen face portion 15 and a flange 17 formed in a state being bent backward from an edge portion 16 of the screen face portion 15. Respective screen members 12 are formed in the same shape. (FIG. 2)

The flanges 17 of the screen members 12 are joined in a state where each one abuts against a flange 17 of adjacent screen member 12. It is convenient to join them with bolts and nuts, clips, etc. through holes 18 formed with an appropriate space on the flange 17.

If the screen upper portion 13 and screen lower portion 14 are joined in a state where broad flanges 19 are similarly abutted each other, the entire screen face portion 15 of the screen 11 shows a smooth curved surface.

Figure 4:
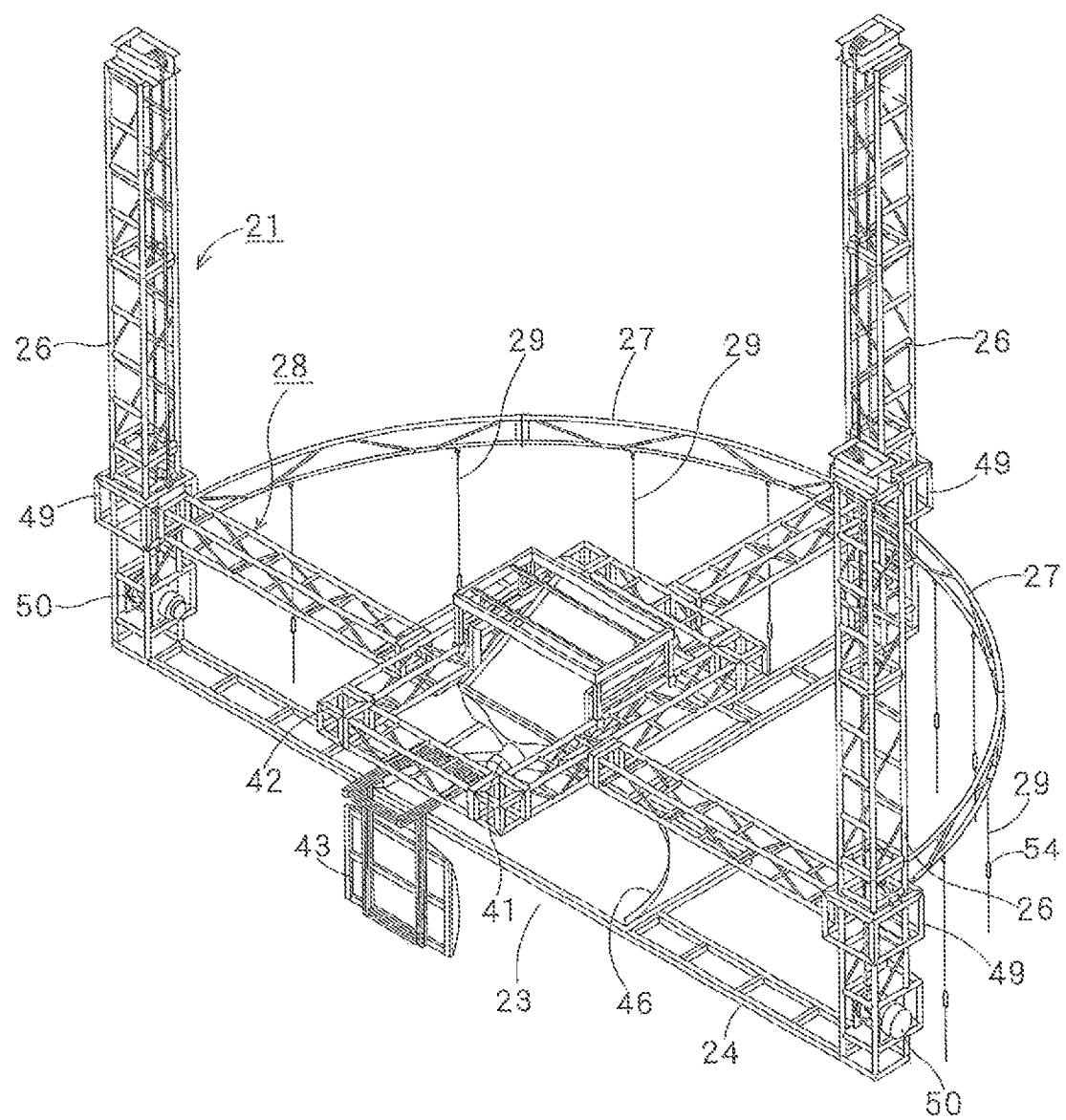
FIG. 4 is a perspective view showing a state before the screen member shown in FIG. 1 is attached.
Figure 5:
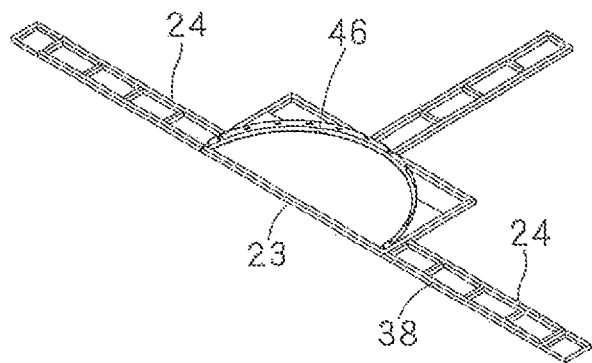
FIG. 5 is a perspective view showing a first fabrication state shown in FIG. 1.
Figure 6:
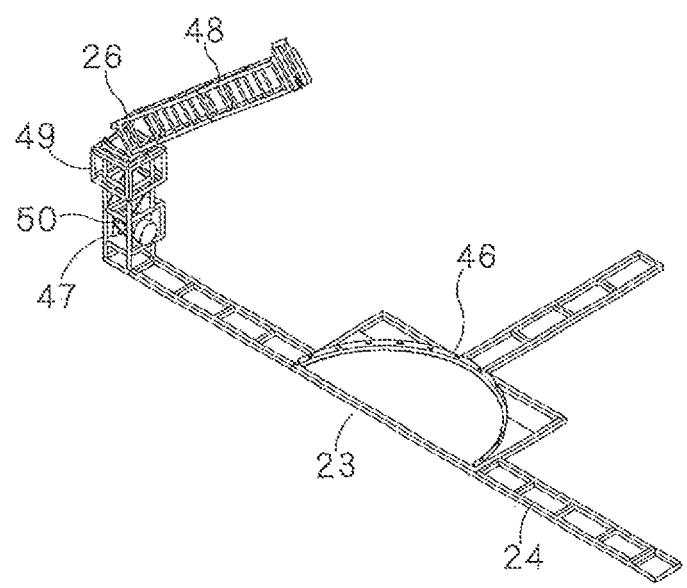
FIG. 6 is a perspective view showing a next fabrication state after FIG. 5.
Figure 7:
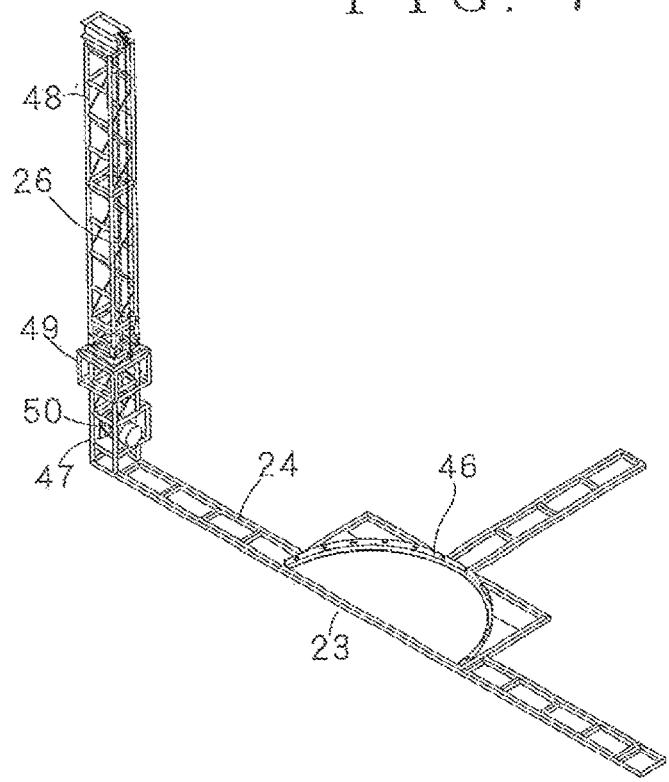
FIG. 7 is a perspective view showing a fabrication state after FIG. 6.
Figure 8:
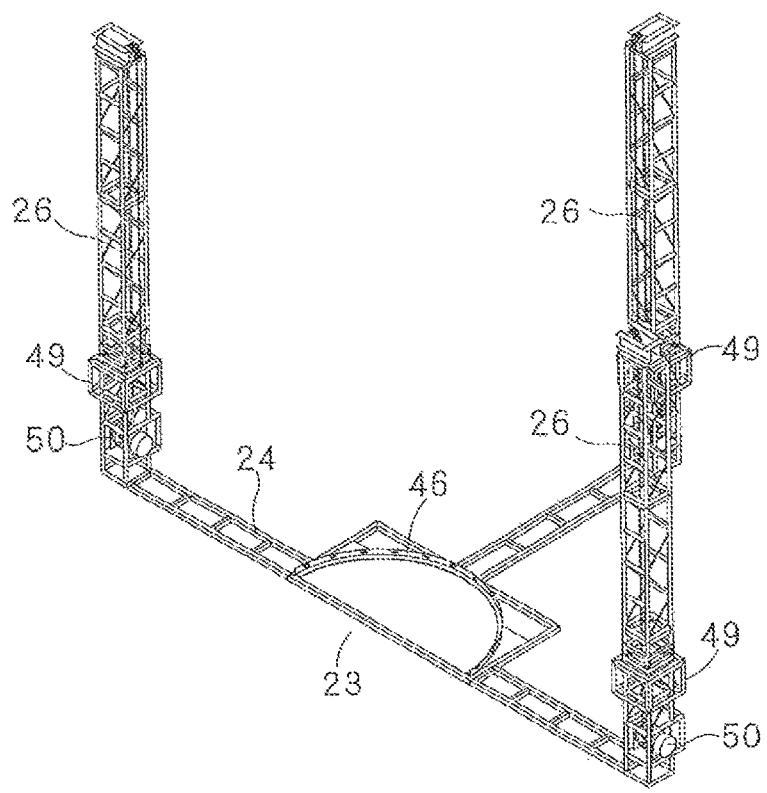
FIG. 8 is a perspective view showing a fabrication state after FIG. 7.

This screen 11 is held in a suspended condition by a frame 21. The frame 21 is composed of plural components, and in the drawing, a basal member 24 is installed on a base site 23 on which the screen 11 is to be provided, plural column, members 26 are stood on the basal member 24, a beam member 28 having an arc-shaped member 27 is positioned at the upper portion of the column members 26. (FIG. 4)

The screen 11 is suspended by an appropriate method by use of the beam member 28. In the drawing, the screen 11 is held in a suspended condition by suspension members 29, sometimes referred to as suspending members 29, which link the arc-shaped member 27 of the of the beam member 28 and the broad flange 19 positioned at the lower end of the screen upper portion 13 Since the screen lower portion 14 is joined to the screen upper portion 13 while respective broad flanges 19 thereof are made to abut each other, the entire screen is held in a suspended condition by the frame 21, load is rarely applied to the screen member 12, and although the screen members are made of a synthetic resin, these members are scarcely bent.

In the screen 11 as shown in the drawing, an upper end side 32 of the screen upper portion 13 and a lower end side 33 of the screen lower portion 14 are partially removed, and at the upper end side 32, a narrow flange portion 20 of the screen member 12 is fixed to a beam member 28 of the frame 21. The fixing is made by, for example, fixing the narrow flange portion 20 of the screen member 12 to a curvature body 45 provided on the beam member 28 by use of fixing tools 30 or the like.

If the lower end side 33 of the screen lower portion 14 is fixed to a curvature body 46 provided on the basal member 24 in the same measures as the above upper end side 32, it becomes possible to more safely hold the entire screen.

The screen 11 may be formed in an appropriate size from a large one to a small one on demand. In the one as shown in the drawing, the lateral width is 5.2 m and the longitudinal width (height) is 3.4 m.

Figure 18:
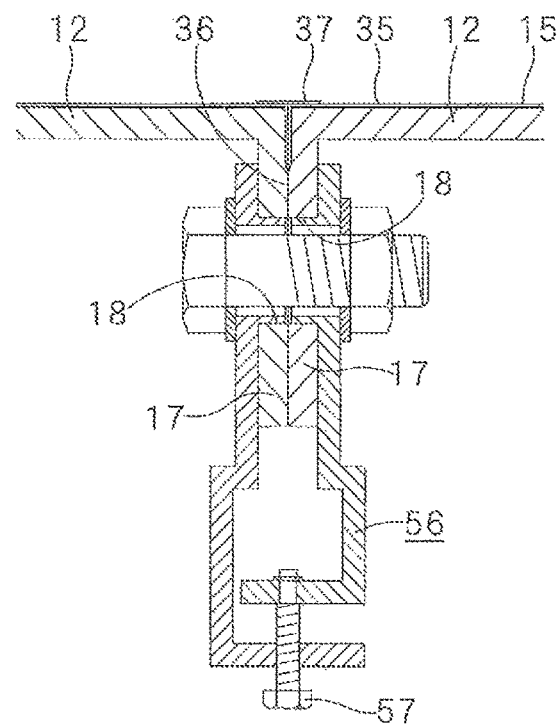
FIG. 18 is a cross-sectional view of the one shown in FIG. 17.

It is preferred to provide a surface-treated layer 35 on the inner face side of the screen face portion 15 of the screen 11 by a paint coat, a film coat, etc. so that the projected image can be clearly displayed. (FIG. 18)

Figure 17:
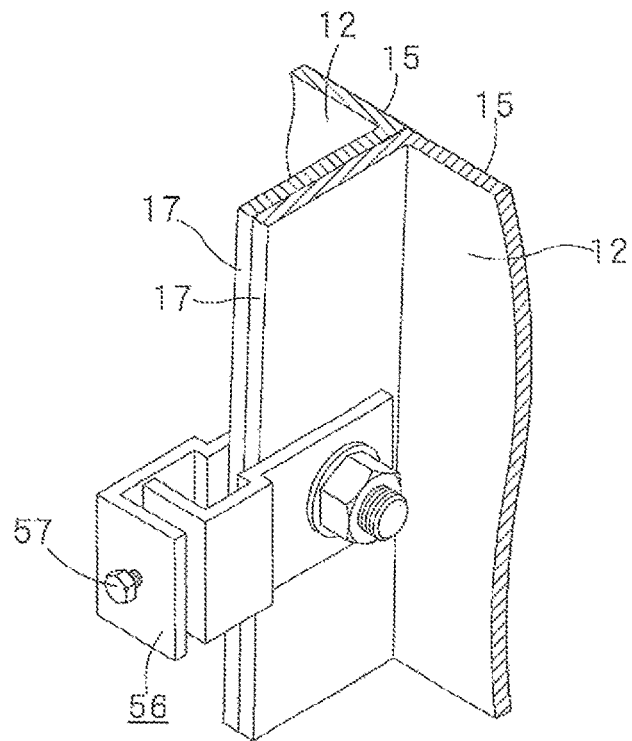
FIG. 17 is a partially omitted perspective view shewing a state where an abutted condition of the screen member is adjusted by an adjustment tool.

The joined screen members 12 of the screen may sometime slightly slip out of an abutted portion 36 of the screen members 12. As measures for such instance, by utilizing the holes for joint 18 provided on the flange 17 of the screen member 12, an adjustment tool 56 is attached and by the rotation of a screw 57, the abutted condition of the flange is moved or changed so that the side of screen face portions 15 on the abutted portion 36 can be adjusted flat. (FIG. 17, FIG. 18)

An abutment line may sometimes appear at the abutted portion 36 of the screen members. In such instance, if a tape 37 or the like is applied on the abutment line, the screen surface may be made smooth in its entirety, such being preferred. (FIG. 18)

In this instance, when the screen 11 is disassembled as mentioned below, it is advisable to remove the tape 37 or the like before disassembling the screen.

Figure 19:
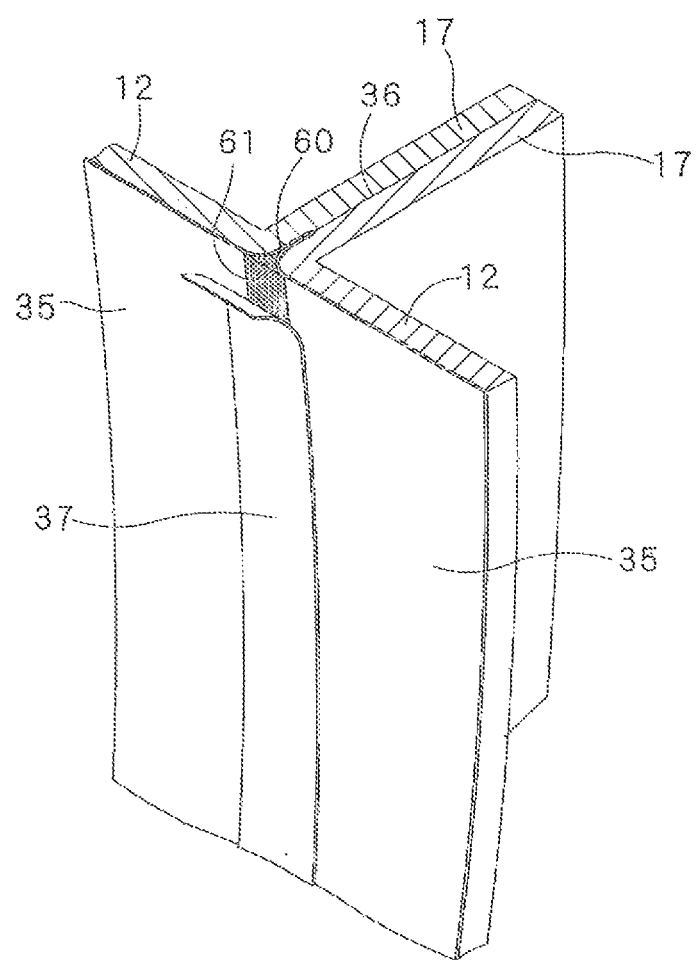
FIG. 19 is a partially omitted, enlarged perspective view showing another abutted condition of the screen member.

When a relatively large abutment line is seen at the abutted portion 36 of the screen members 12 as shown in FIG. 19, a distinct line which influences the projected stereoscopic image may sometimes appear. In such instance, it is treated by filling a groove portion 60 of, for example, V-shaped form at the abutment line with a filler 61 keeping flexibility such as oil-based clay, and by making the surface smooth by a pallet. And, by applying the tape 37 thereon, the entire surface can be made a smooth screen face, such being preferred.

In such instance, when the screen 11 is disassembled, it is advisable to disassemble it after peeling the tape 37 or the like and removing the flexible filler 61.

The components of the frame 21 are made of tough materials, for example, a metal such as a steel material, plastics having a high rigidity, lumber, etc. The ones as shown in the drawing are constituted by various types of truss materials 38 formed by a steel material. Respective truss materials 38 may be joined by bolts and nuts, or clips (not shown) in a fabricated state, or the joint is disengaged into a disassembled state.

As a projector 41 projecting the images on the screen 11, various types may be used depending on the purpose. In the drawing, a supporting portion 42 is provided at the beam member 28 of the frame 21, and the projector 41 is set thereon. In front of the projector 41, a convex reflex mirror 43 is similarly installed on the supporting portion 42, and the light projected from the projector 41 is reflected by the convex reflex mirror 43 and the stereoscopic image can be displayed on the entire surface of the face portion 15 of the screen 11.

The projector 41 can be set at the supporting portion 42 on the beam member 28 as shown in FIG. 20. A holding frame 66 is positioned above a supporting basis portion 65 of the supporting portion 42, and the projector 41 is kept in such a state that it is suspended from a holding member 67 provided on a holding frame 66 by use of a rod 68.

The holding frame 66 is movable forward and backward on a rail 69 provided on the supporting basis portion 65 by use of a roller 70, and can be stopped/set at the desired position by inserting a pin or the like into a hole 71 provided on the rail 69.

A holding member 67 which holds the projector 41 is designed so that the distance from the holding frame 66 can be adjusted upward and downward by an adjustment rod 72. Further, between a front part 73 of the projector 41 and the holding member 67, an adjustment tool 74 is provided so that the slant angle of the projector 41 can be changed.

The optical axis and distance of the projector 41 can easily be adjusted by appropriately employing the above-mentioned rail mechanism capable of moving a roller forward and backward, the mechanism of the adjustment rod 72 changing the distance upward and downward, and a tilt mechanism of the adjustment tool 74 capable of changing the slant angle. This, it becomes easy to conduct fine adjustment when images are projected and obtain good projected stereoscopic images.

Further, since the holding frame 66 provided with the holding member 67 holding the projector 41 is movable forward and backward on the rail 69 of the supporting basis portion 65, it is easy to move the holding frame 66 to a position remote from the screen member 12, and to replace the projector 41 now being held with a projector of other type.

A dome screen 40 may be fabricated as explained below. (FIG. 5 to FIG. 14)

At first, on a basal site 23 on which a dome screen 40 is to be installed, a basal member 24 to which a truss material 38 is joined is placed, and a column member 26 to which a truss material 38 is similarly joined is stood.

In the drawing, the basal member 24 is formed in a substantially T-character shape, and a curvature-shaped body 46 to which the lower end side 33 of the screen lower portion 14 is to be fixed is provided. Three column members 26 are stood from the edge part of the basal member 24. In mounting the column member 26, the truss material at the lower portion 47 of the column member is fixed to the basal member 24, a lifting member 49 is fitted thereto, and the upper part 48 of the column member is joined thereto, and then the column member 26 is stood. Other two column members 26 are similarly stood.

To the lifting member 49, a beam member 28 having an arc-shaped member 27 extending backward is fixed. The lifting member 49 is movable upward and downward along the column member 26 by a winch 50 provided at the lower portion or upper portion of the column member 26, whereby it becomes possible to move the beam member 28 upward and downward.

The beam member 28 is raised to an intermediate portion of the column member 26, and a suspending member 29 extending downward from the arc-shaped member 27 of the beam member 28 is joined to a wide flange portion 19 of the screen member 12 of the screen upper portion 13. And, a narrow flange portion 20 of the screen upper portion is fixed to the curvature-shaped body 45 of the beam member 28 by the above-mentioned fixing tools 30 or the like, and the screen member 12 of the screen upper portion 13 is held in a suspended condition from the beam member 28.

Other screen members 12 are similarly brought into a suspended condition and then joined to adjacent screen members 12, whereby the screen upper portion 13 is formed and the screen upper portion 13 can be stably suspended from the beam member 28 of the frame 21.

The screen upper portion 13 is thus fabricated, and when the lifting member 49 is moved further upward, the screen upper portion 13 suspended from the beam member 28 is lifted upward. Then, the wide flange portion 19 of the screen member 12 of the screen lower portion 14 is fixed to the wide flange portion 19 of the screen member 12 of the screen upper portion 13, and the lower end of the screen member 12 is fixed to the curvature-shaped body 46 of the basal member 24, whereby the screen member 12 of the screen upper portion 13 and the screen member 12 of the screen lower portion 14 are joined each other.

Other screen members 12 are similarly joined to the screen upper portion 13 and subsequently joined to the adjacent screen member 12, whereby the screen lower portion 14 is linked to the screen upper portion 13.

The thus formed screen 11 can be stably held in a state where the screen 11 is suspended from the beam member 28 of the frame 21. In this instance, if the lifting member 49 is detached and the screen is fixed by a possible pin instead, it is possible to avoid accidental down of the lifting member 49 and keep the screen more stably.

When the above-mentioned suspending member 29 is provided with an adjustment body such as a turn buckle 54, the length of the suspended member can be changed, whereby the suspended condition of the screen 11 can appropriately be adjusted, such being convenient.

The screen members 12 forming a screen as shown in the drawing are formed in the same shape, but it is possible to combine different shapes between, for example, the screen upper portion 13 and the screen lower portion 14.

The projector projecting the stereoscopic image on the screen 11 may be used by arranging it at an appropriate position, and in the drawing, the projector 41 is set onto the supporting portion 42 provided on the beam member 28 and in front of it, a convex reflex mirror 43 is provided.

Figure 9:
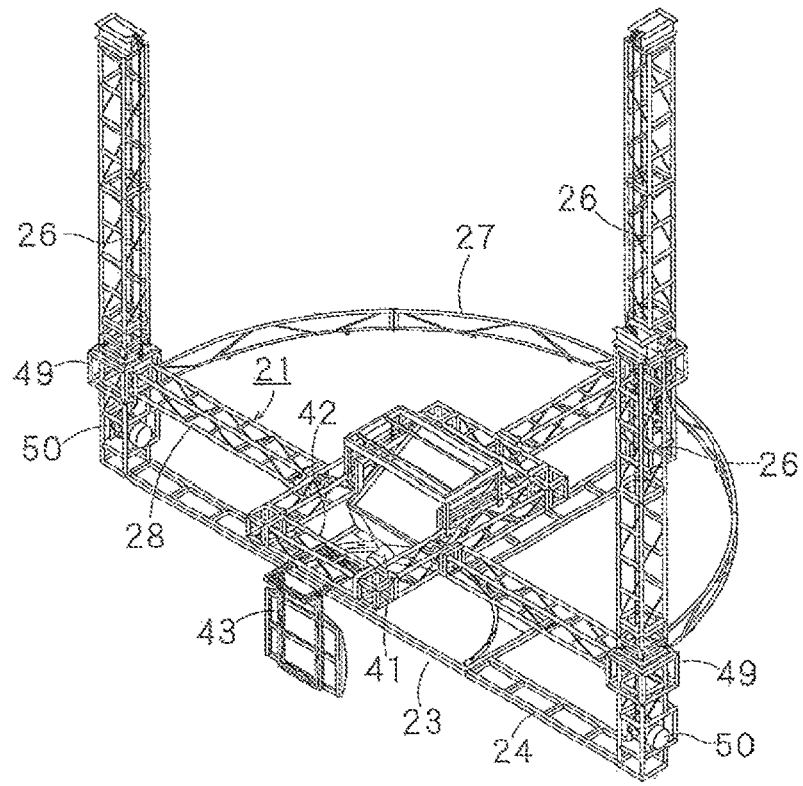
FIG. 9 is a perspective view showing a fabrication state after FIG. 8.
Figure 10:
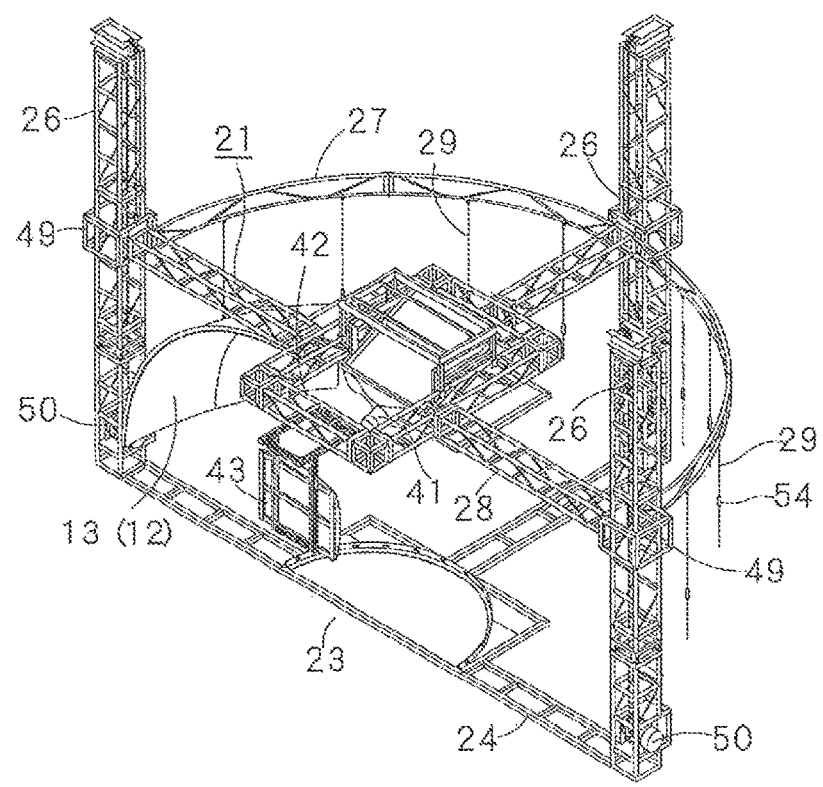
FIG. 10 is a perspective view showing a fabrication state after FIG. 9.
Figure 11:
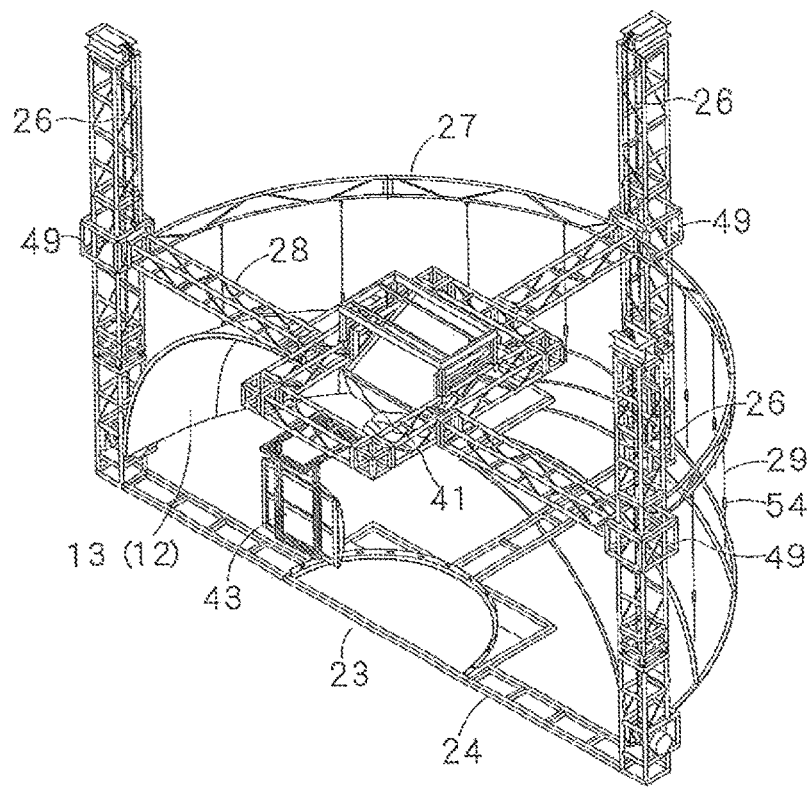
FIG. 11 is a perspective view showing a fabrication state after FIG. 10.
Figure 12:
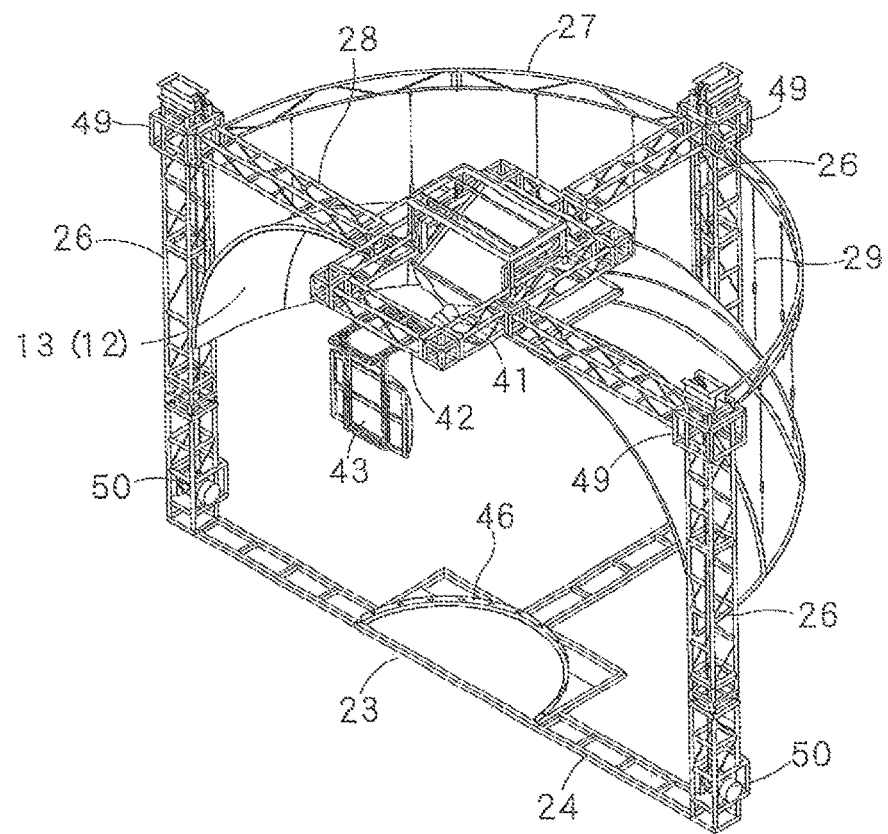
FIG. 12 is a perspective view showing a fabrication state after FIG. 11.
Figure 13:
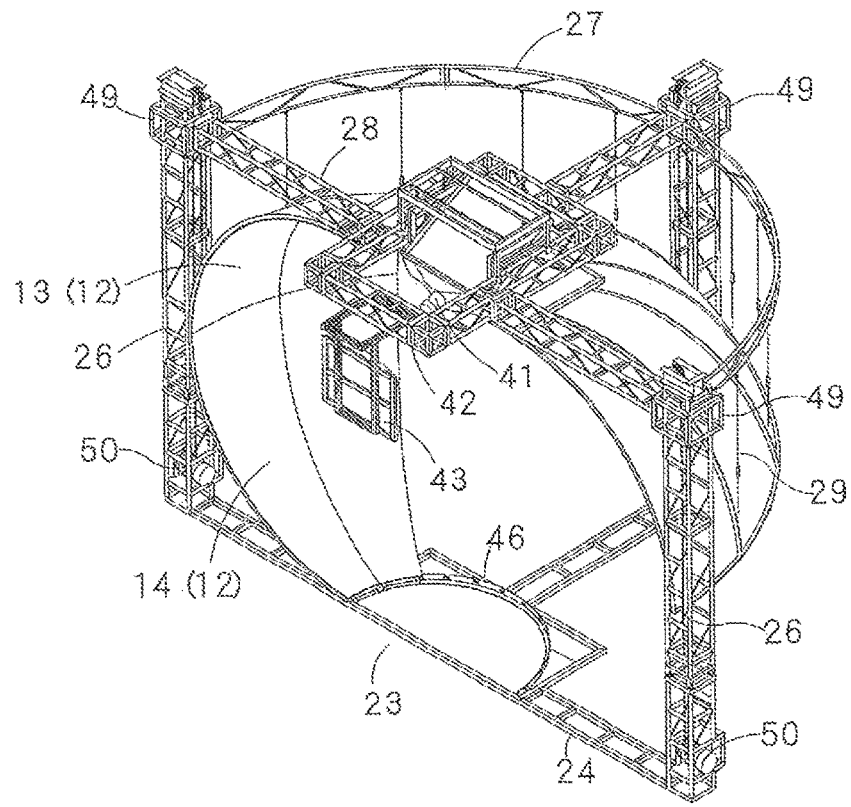
FIG. 13 is a perspective view showing a fabrication state after FIG. 12.
Figure 14:
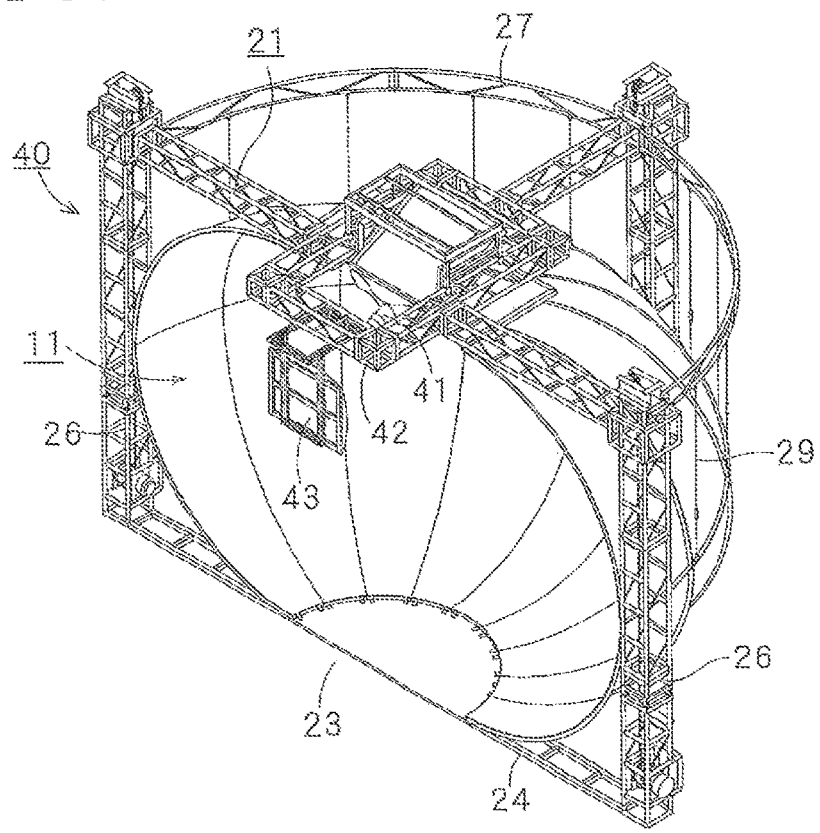
FIG. 14 is a perspective view showing a fabrication state after FIG. 13.

In this arrangement, when the beam member 28 is positioned at the lower position, the projector 41 and the convex reflex mirror 43 are set to the supporting member 42 and then lifted upward, and the screen 31 can be fabricated thereafter, whereby attachment thereof is easy even if the projector 41 is heavy, it is easy to operate it, and since it is located above the screen, viewers watching the stereoscopic image displayed on the screen will not encounter obstacles. (FIG. 4, FIG. 9)

Figure 15:
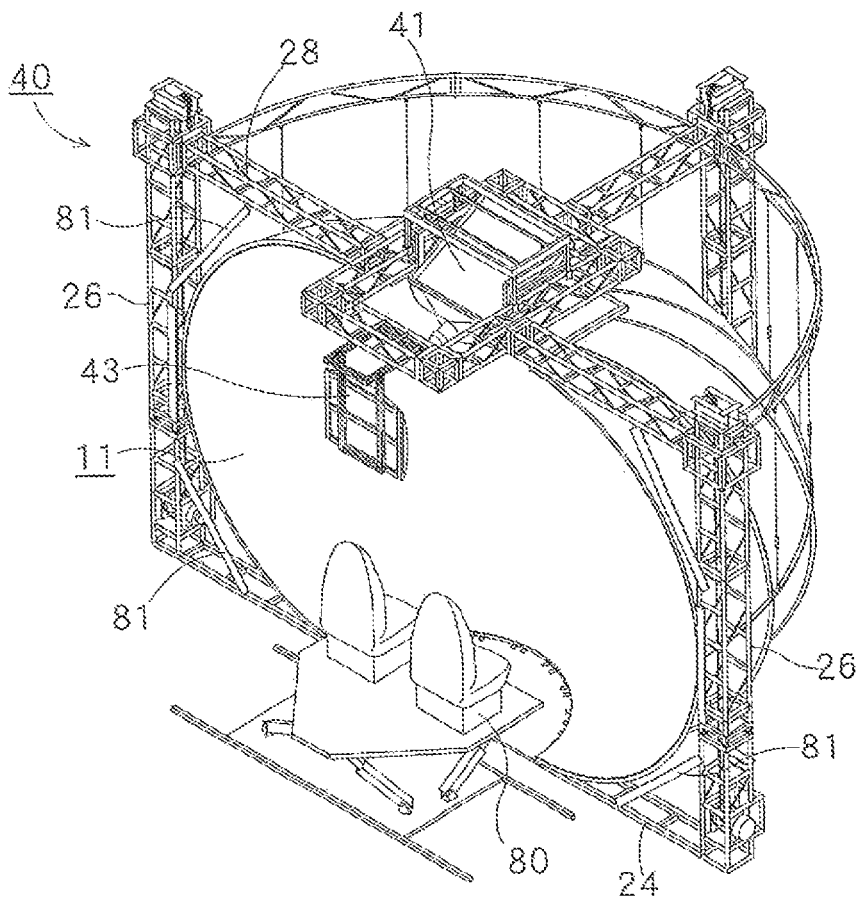
FIG. 15 is a perspective view showing a state where a stereoscopic image is projected on the screen.

When the projector 41 is operated, the image from the projector is reflected by the convex reflex mirror 43 and displayed on the screen 11 in its entirety, and therefore audience can watch it in a free style e.g. getting out of or sitting on a seat, and enjoy the displayed stereoscopic image. (FIG. 15)

As the stereoscopic image, various types of images can be freely chosen, for example, a sightseeing flight by a light airplane or helicopter, motor racing, off-road racing, panoramic landscape view, etc.

For viewers, a motion device 80 may be prepared, and it becomes possible to enjoy images with further ambience by changing the position and posture depending on the motion of images displayed on the screen. Further, by sounding from a speaker 81 installed on the frame together with the motion, sound effects will be increased and, by sending air or aroma, further excellent ambience can be enjoyed.

The dome screen 11 can be disassembled, in reverse order of fabrication, by disassembling the screen lower portion 14, moving the beam member 28 downward, and then disassembling the screen upper portion 13. Then, by successively disassembling the beam member 28 of the frame 21, column member 26 and basal member 24, the entire screen can be disassembled easily.

Figure 16:
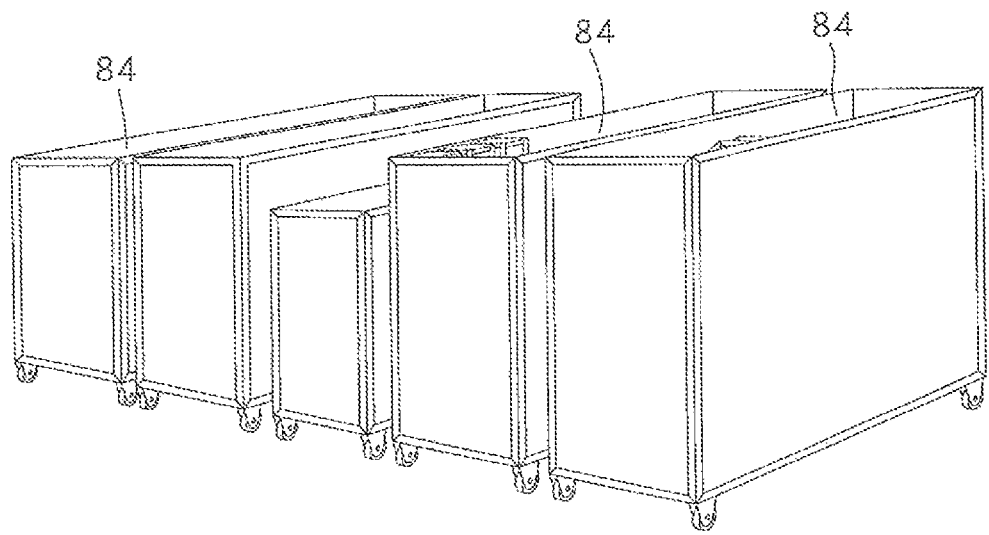
FIG. 16 is a perspective view showing a state where the one shown in FIG. 1 is disassembled and put away in a housing carrier.

The thus disassembled parts may be classified, into respective members such as the screen member 12 or frame 21, and these are stored separately in respective housing carriers 84, whereby easy storage and transfer can be made, and at its destination, these parts can be fabricated again for use. (FIG. 16)

The screen as shown in the drawings is hemispherical shape (180°) in a lateral direction, but by changing the number of screen members, screens of 100°, 240°, 280° or the like may be prepared. Further, by forming a circumferential screen (360°), installing plural projectors, and putting a viewer inside the screen, the viewer can watch the image in a state where he or she is surrounded by the screen.

When the screen is formed in a bowl shape using the lower half of a sphere and the image is projected on it, viewers overlook the image from sidewise upper portion. Contrarily, when the screen is formed in a bowl shape using the upper half of a sphere, viewers look up the image from the lower portion. Namely, viewers can enjoy various types of images by diverse screen forms.

The dome screen of the present invention can be used widely for events in public facilities or commercial facilities, uses in educational institutions, researches, etc. Further, fabrication, disassembling and transfer are possible as mentioned above, whereby the dome screen of the present invention can be used as a movable facility for various applications.

EXPLANATION OF SYMBOLS 11 screen
12 screen member
13 screen upper portion
14 screen lower portion
17 flange portion
21 frame
24 basal member
26 column member
28 beam member
29 suspending member
40 dome screen
41 projector
43 convex reflex mirror
49 lifting member
56 adjustment tool
61 filler
65 supporting basis portion
67 holding member
69 rail
80 motion device
81 speaker
84 housing carrier

The invention claimed is:

1. A dome screen projection apparatus that can be assembled and disassembled on site and moved to another site for assembly and disassembly, the dome screen projection apparatus comprising: plural screen members made of a synthetic resin and detachably joined together to form a dome screen having a curved configuration; plural frame members detachably connected together to form a frame; suspension members suspending the dome screen in a suspended condition from the frame; and a projector supported by the frame configured to project an image on an inner face of the dome screen while in the suspended condition.

2. The dome screen projection apparatus according to claim 1; wherein the projector is supported at an upper part of the frame and is provided with a convex reflex mirror which reflects an image from the projector and projects the image on the inner face of the screen.

3. The dome screen projection apparatus according to claim 2; wherein the projector is held by an adjustment mechanism at the upper part of the frame, the adjustment mechanism being configured to adjust the position of the projector forward and backward, upward and downward, and the angle of inclination of the projector.

4. The dome screen projection apparatus according to claim 1; wherein the screen members are solid synthetic resin members.

5. The dome screen projection apparatus according to claim 4; wherein the screen members have inner and outer faces and a flange extending outward from an edge portion of the outer face, the flanges of adjacent screen members abutting one another and being detachably connected together.

6. The dome screen projection apparatus according to claim 5; further comprising an adjustment tool attached to abutting flanges to finely adjust the abutment position of the abutting flanges.

7. The dome screen projection apparatus according to claim 1; wherein the dome screen has a generally hemispherical shape with an open front that enables viewers located in front of the dome screen to view an image projected on the inner face of the dome screen.

8. The dome screen projection apparatus according to claim 7; wherein the frame members include frame column members disposed on the outside of the dome screen, one at each side of the dome screen and one at the rear of the dome screen, a frame beam member supported at opposite ends at upper portions of the two frame column members at each side of the dome screen and extending above the top front portion of the dome screen, and a frame arc-shaped beam member supported at upper portions of the frame column members.

9. The dome screen projection apparatus according to claim 8; wherein the suspension members are suspended at one end from the frame arc-shaped beam member and connected at the other end to the dome screen.

10. The dome screen projection apparatus according to claim 1; further comprising a motion device for moving the position of the viewers relative to the dome screen by which viewers feel ambience depending on the projected images.

11. A dome screen apparatus that can be assembled and disassembled on site and moved to another site for assembly and disassembly, the dome screen apparatus comprising: plural screen members made of a synthetic resin and detachably joined together to form a dome screen having a curved configuration with an arcuate inner surface that displays images projected thereon from inside the dome screen; plural frame members detachably connected together to form a frame; and suspension members suspending the dome screen in a suspended condition from the frame.

12. The dome screen projection apparatus according to claim 11; wherein the screen members are solid synthetic resin members.

13. The dome screen projection apparatus according to claim 12; wherein the screen members have inner and outer faces and a flange extending outward from an edge portion of the outer face, the flanges of adjacent screen members abutting one another and being detachably connected together.

14. The dome screen projection apparatus according to claim 13; further comprising an adjustment tool attached to abutting flanges to finely adjust the abutment position of the abutting flanges.

15. The dome screen projection apparatus according to claim 11; wherein the dome screen has a generally hemispherical shape with an open front that enables viewers located in front of the dome screen to view an image projected on the inner face of the dome screen.

16. The dome screen projection apparatus according to claim 15; wherein the frame members include frame column members disposed on the outside of the dome screen, one at each side of the dome screen and one at the rear of the dome screen, a frame beam member supported at opposite ends at upper portions of the two frame column members at each side of the dome screen and extending above the top front portion of the dome screen, and a frame arc-shaped beam member supported at upper portions of the frame column members.

17. The dome screen projection apparatus according to claim 16; wherein the suspension members are suspended at one end from the frame arc-shaped beam member 7 and connected at the other end to the dome screen.

* * * * *